United States Patent [19]

Chamberlain et al.

[11] 4,368,492
[45] Jan. 11, 1983

[54] VERTICAL SYNC INDEPENDENT DIGITAL SKEW SERVO

[75] Inventors: James W. Chamberlain, Philadelphia, Pa.; Arthur M. Goldschmidt, Moorestown, N.J.

[73] Assignee: RCA Corporation, New York, N.Y.

[21] Appl. No.: 161,452

[22] Filed: Jun. 20, 1980

[30] Foreign Application Priority Data

Apr. 8, 1980 [GB] United Kingdom ............... 8011558

[51] Int. Cl.$^3$ ..................... G11B 21/02; G11B 5/43
[52] U.S. Cl. ......................................... 360/70; 360/76
[58] Field of Search ................. 360/69, 70, 71, 73, 360/75, 76, 36; 307/222 R, 471, 511, 514–516; 328/63, 74, 110, 132, 134; 358/8

[56] References Cited

U.S. PATENT DOCUMENTS

| | | | |
|---|---|---|---|
| 3,686,469 | 8/1972 | Clark et al. | 360/70 |
| 3,849,671 | 11/1974 | Molack | 307/511 |
| 4,020,422 | 4/1977 | Underhill | 307/511 X |
| 4,206,485 | 6/1980 | Sakamoto | 360/70 |
| 4,259,698 | 3/1981 | Takada | 360/70 |
| 4,278,924 | 7/1981 | Mawatam et al. | 360/70 X |

Primary Examiner—Aristotelis M. Psitos
Attorney, Agent, or Firm—E. M. Whitacre; W. H. Meise; H. I. Steckler

[57] ABSTRACT

To continuously correct for tape stretching ("skew"), the phase of timed video information on the tape is compared with a reference at two different times, thereby forming two comparison signals. The two comparison signals are subtracted from each other to form an error signal, which is used to continuously correct the tape length variations.

11 Claims, 34 Drawing Figures

Fig. 6.

| | CONDITION | SKEW SWITCHING LOGIC | | | | GENERAL COMMENT |
|---|---|---|---|---|---|---|
| | | 120° | ZERO | FREEZE | DISABLE | |
| STATE ONE | MANUAL TEST TAPE SET - MANUAL PUSHBUTTON IS ACTIVATED | 0 | 0 | 1 | 0 | ALLOWS THE SETTING OF A SET MAN. SKEW CORRECTION VIA A STANDARD TEST TAPE. |
| STATE TWO | MANUAL - MANUAL SWITCH IS ON | 0 | 0 | 1 | 1 | ALLOWS THE SETTING OF A SET MANUAL SKEW CORRECTION FOR A PARTICULAR VIDEO TAPE. |
| | THREAD | 0 | 0 | 1 | 0 | INITIALIZES THE SKEW SERVO LOOP. (ZERO DIGITAL MEMORY AND OPEN THE SERVO LOOP) |
| | NORMAL VIDEO RECORD | 0 | 0 | 1 | 0 | SAME AS THREAD |
| | VIDEO SPLICE RECORD OR VARIABLE PLAY OR JOG | 0 | 1 | 0 | 1 | APPLIES THE LAST SKEW SAMPLE BEFORE MODE CHANGE. (STORE THE DIGITAL SKEW ERROR AND CLOSE SERVO LOOP) |
| STATE THREE | PLAY OR SPLICE PLAY | 0 | 1 | 1 | 1 | ALLOWS CONTINUOUS DETECTION AND CORRECTION OF SKEW ERROR |
| | SPLICE PLAY VIA SIMULPLAY HEADS | 1 | 1 | 1 | 1 | ALLOWS CONTINUOUS DETECTION AND CORRECTION OF SKEW ERROR WITH 262.5/3 LINE SHIFT IN DETECTION PROCESS. |
| | ALL OTHER MODES | 0 | 1 | 0 | 0 | STORES THE LATEST SKEW ERROR CORRECTION BEFORE MODE CHANGE AND OPENS SERVO LOOP. |

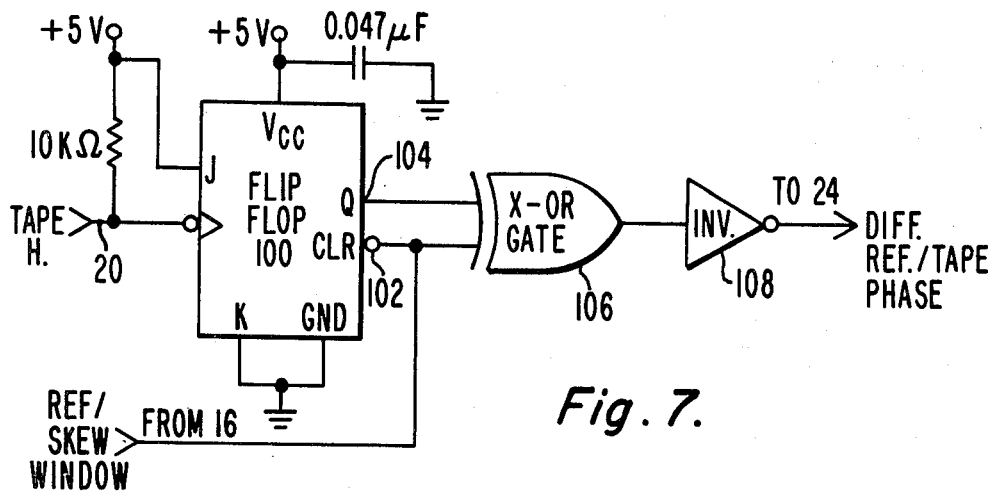
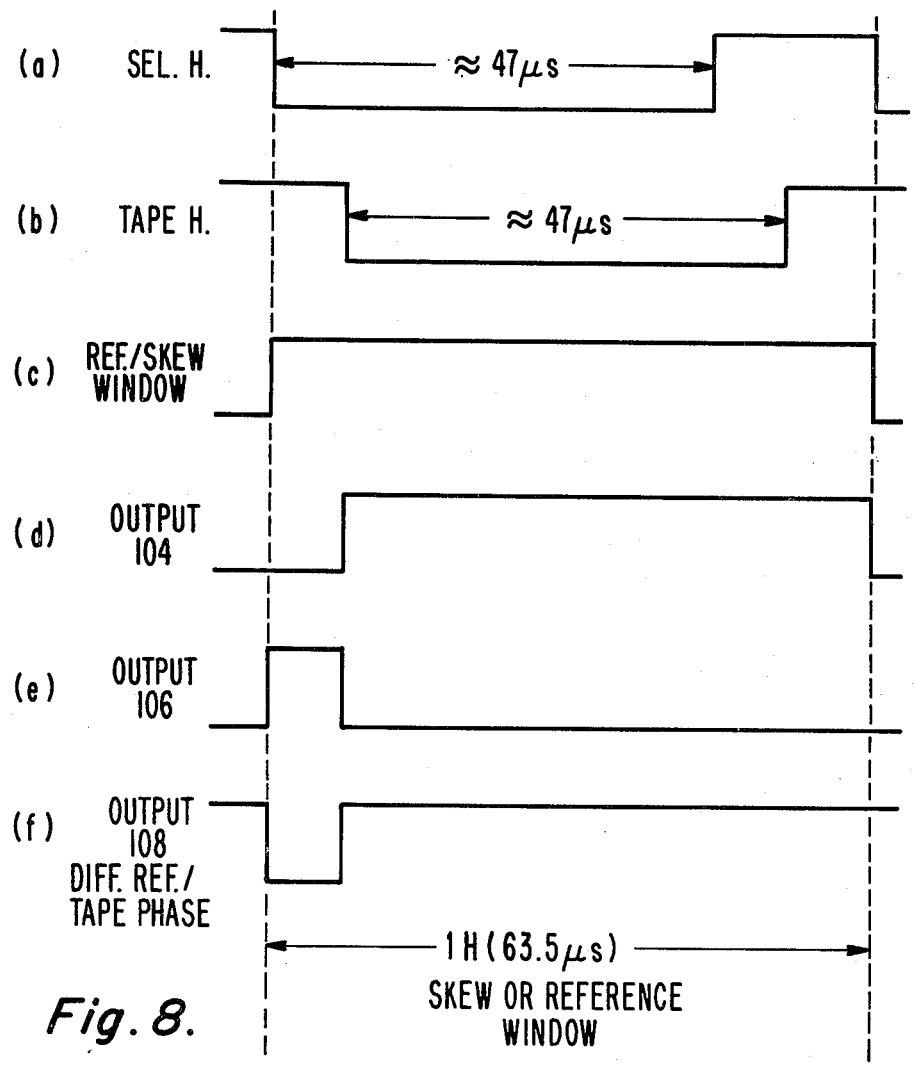
Fig. 7.
Fig. 8.

VERTICAL SYNC INDEPENDENT DIGITAL SKEW SERVO

BACKGROUND OF THE INVENTION

The present invention relates to the operation of a closed loop feedback system that automatically corrects for skew error in the playback of a television video tape recording, and more particularly, to such a feedback system that performs such a correction whether or not vertical synchronization information is present.

When playing back a video tape recording, the effective length of the tape can change. This is called "skew" and can be caused by varying head to tape air gaps or by playing back the tape on a different machine than was used to record the tape, which can have a slight tension and tolerance difference from the recording machine. In any case, there is a change in the effective physical length of the tape on playback, which results in a change in duration of the recorded television horizontal lines. A recorded tape may be played back on a helical type video playback machine and, the resulting video may be displayed on a video monitor. When a helical-scan playback machine is arranged to synchronize the tape-derived horizontal sync signal with a local standard reference sync signal during each vertical sync interval, the difference in duration between the recorded horizontal lines and that defined by the standard reference sync signal causes a progressive change in the time of occurrence of the tape-derived horizontal sync signal relative to the standard sync signal during the remainder of the vertical interval. When reviewed on a monitor the horizontal deflection of which is synchronized with the local standard sync signal, the displayed video may include the tape-derived horizontal sync signal, thereby causing an apparent offset in the starting (left) edge of the displayed video, and this offset becomes progressively greater near the bottom of the raster. The effect of the skew variation is partially corrected at the bottom of the picture, when the video tape signal is resynchronized to an external reference synchronization source using the vertical synchronizing pulse from the recording. Further, if one wishes to splice in a segment of a video information on the tape, the durations of the spliced horizontal lines may be different, causing a skew transient in the displayed picture about the spliced recording.

It is therefore desirable to correct for the effects of this varying tape length on a time continuous basis.

SUMMARY OF THE INVENTION

This is accomplished by measuring the phase of timed video information on the tape with respect to the timed video information that the recorder uses as a reference. The measurement itself is made a few horizontal lines before the vertical interval and then again a few lines after the same interval. Since the tape information is rephased to the reference information during the vertical interval by the drum servo, the difference between the aforestated measurements is a measure of the skew error present on tape. This error measurement is used to continuously correct the effective tape length variations during normal playback of the video tape.

DESCRIPTION OF THE DRAWINGS

FIG. 6 is a table explaining internal states of FIG. 1;

FIG. 7 is a block diagram of an exclusive OR phase detector used in FIG. 1; and

FIG. 8, including a-f, show waveforms used in FIG. 7.

Figure 1:
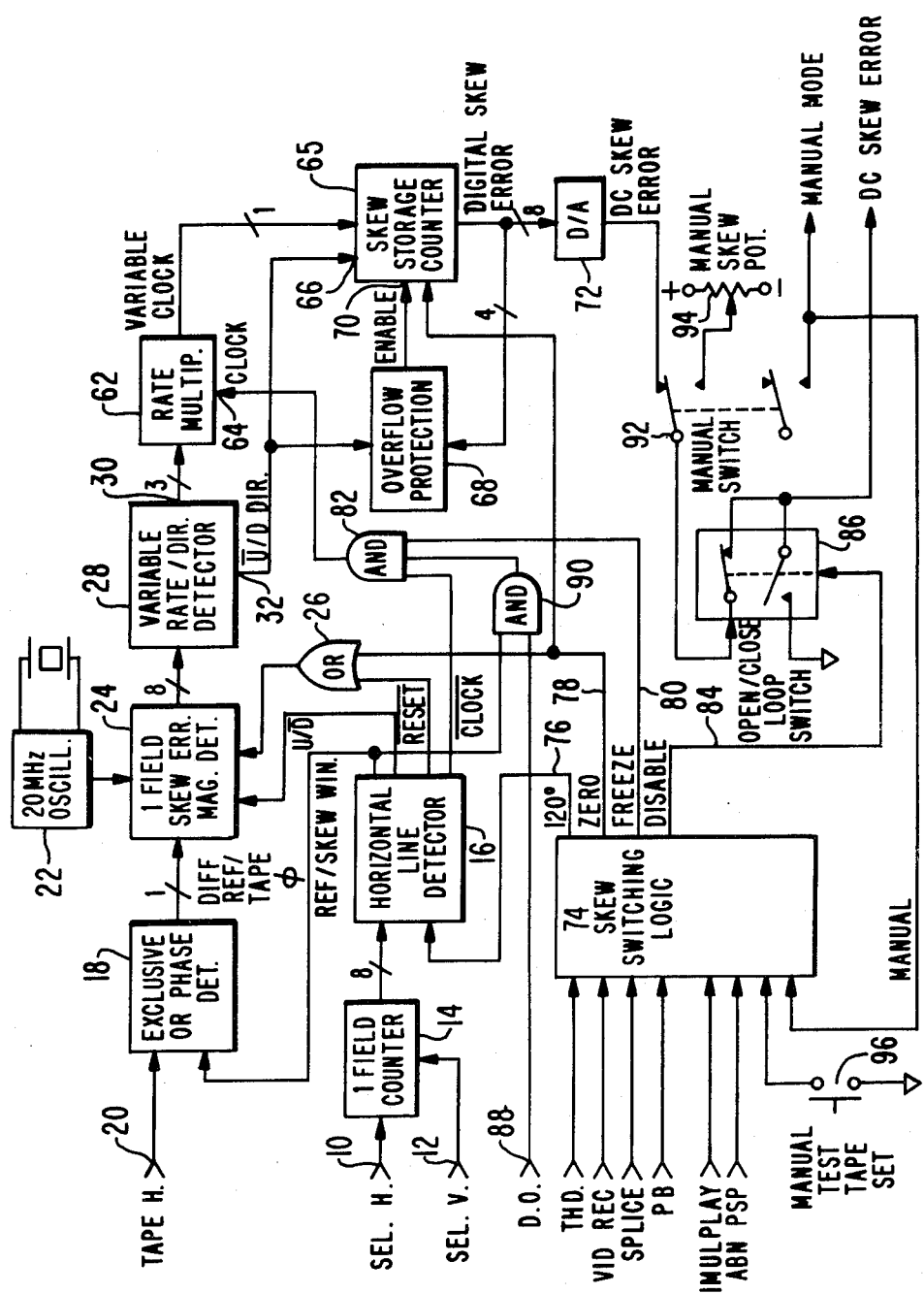
FIG. 1 shows a block diagram of the system of the invention.
Figure 2:
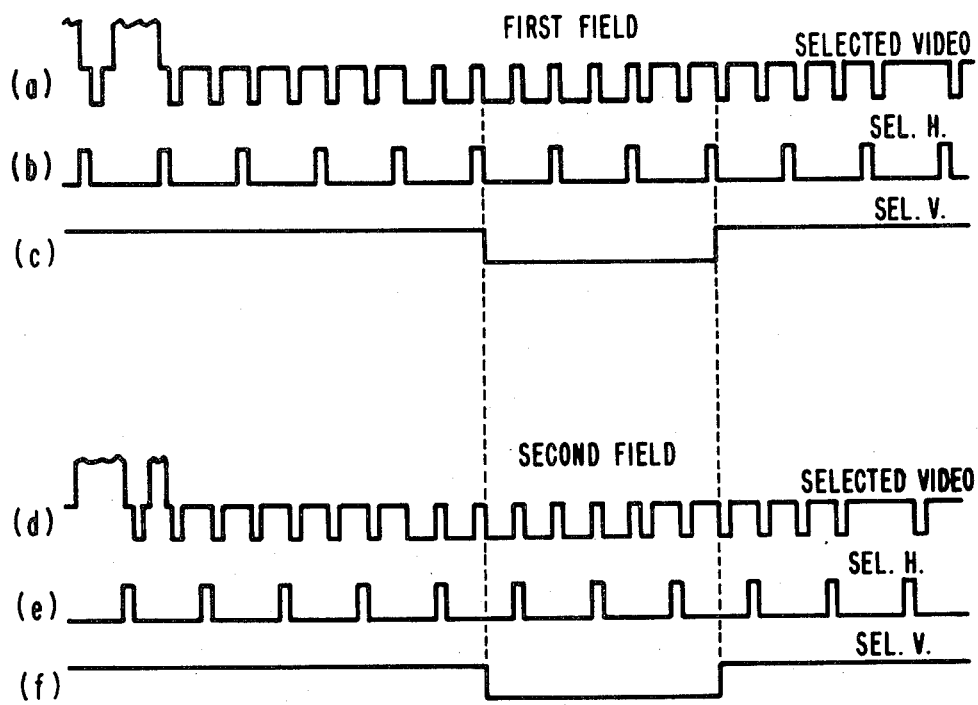
FIG. 2, consisting of a-f, show input waveforms applied to the system of FIG. 1.
Figure 3:
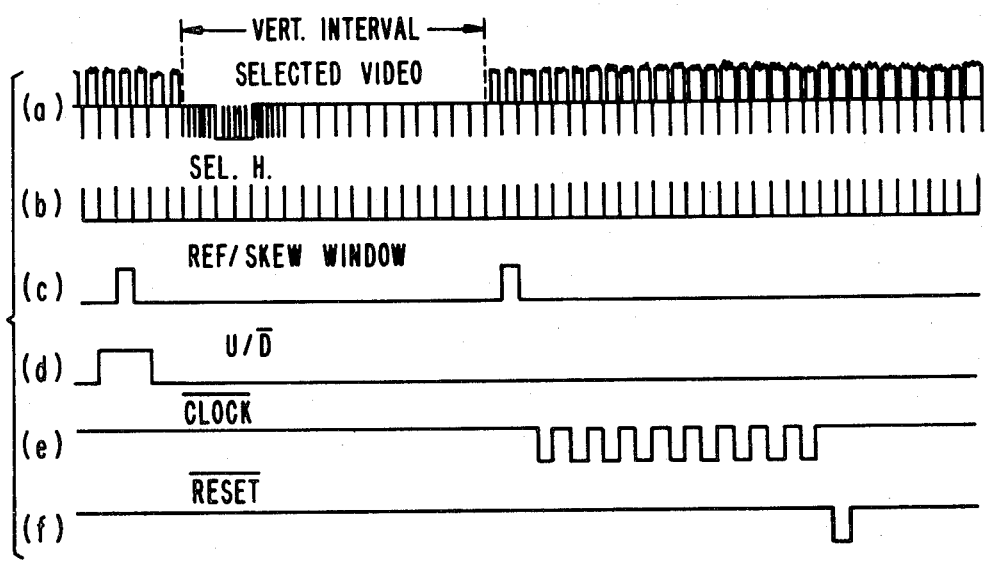
FIG. 3, consisting of a-f, shows waveforms generated internally in FIG. 1.

Referring to the system diagram of FIG. 1, an input terminal 10 for a signal called SEL.H (selected horizontal) is shown. This signal from an external source, not shown, is part of the recorder's reference information, and as shown in FIG. 2b, is a pulse train of constant duty cycle occurring at a horizontal line rate. Also shown is an input terminal 12 for an externally generated signal called SEL.V (selected vertical), which, as shown in FIG. 2c, is a train of negative pulses of constant duty cycle occurring at a field rate. The relationship of SEL.H and SEL.V. to the selected video information is shown in FIG. 2 in a time window about the vertical interval, for both first and second fields. This SEL.H. signal is counted during each field by the one-field counter 14. The count begins and terminates at the trailing (positive-going) and leading (negative going) edges of SEL.V. respectively. This binary count addresses a horizontal line detector 16 which is an EPROM (erasable programmable read only memory). The detector 16 produces four signals during each field which are in phase with SEL.H. These signals have been labeled, REF/SKEW WINDOW, U/D, $\overline{CLOCK}$ and $\overline{RESET}$. A timing diagram relating each of these signals to Selected Video and SEL.H. is shown in FIG. 3c, d, e and f respectively, for the first field only.

REF/SKEW WINDOW is a one horizontal line wide positive pulse occurring twice in one field. As noted in FIG. 3c, the pulse occurs just before and just after the vertical interval. This signal is used as the sample window for the skew error measurement. The positive-going edge of this signal is synched with the negative-going edge of SEL.H. This signal is fed from horizontal line detector 16 to the exclusive OR phase detector 18.

In detector 18, the positive-going edge of the REF/SKEW WINDOW pulse is compared with a negative-going edge of TAPE.H. signal present at input terminal 20, where TAPE.H. originates from the tape and has the same waveform as SEL.H., but with irregular timing. The comparison process is an exclusive OR phase detection, which produces two pulses whose widths are a measure of the exact phase difference between SEL.H. and TAPE.H. just before and after the vertical interval, respectively at the time of comparison. The first pulse is the measurement of skew error plus the control track phase offset, where control track phase offset is the phase difference of TAPE.H. to selected H just after the vertical interval, and the second pulse is just the measurement of the control track phase offset. Since this measurement is made just before and just after vertical synchronization, the difference between the two pulse widths is a measure of tape skew error across one field. It is this fact that makes it possible to measure the skew error in the absense of vertical sync information. To accurately measure the width of these pulses to within 100 nanoseconds of differential error, a 20 megahertz oscillator 22 is employed which can be a crystal controlled TTL oscillator. Using this oscillator as a measurement clock, the resolution of any pulse width measurement is 50 nanoseconds with a pulse width differential resolution of 100 nanoseconds.

This measurement clock signal is fed to a 12 bit up/down counter 24, which is enabled by, and thus counts during the occurrence of the two aforementioned pulses from detector 18. The counter 24 is termed the one field skew magnitude error detector. To obtain a count measurement of the difference between the width of the two pulses, the counter 24 counts up during the pulse from detector 18 occurring just before vertical sync and down during the pulse occurring just after sync. This differential count is fed to a PROM called a variable rate/direction detector 28. The counter 24 is reloaded to a zero state a short time after the second pulse from detector 18. The pulses controlling the up/down count and the counter reloading are generated via the horizontal line detector 16 and are called U/$\overline{D}$ and $\overline{RESET}$ respectively.

Figure 4:
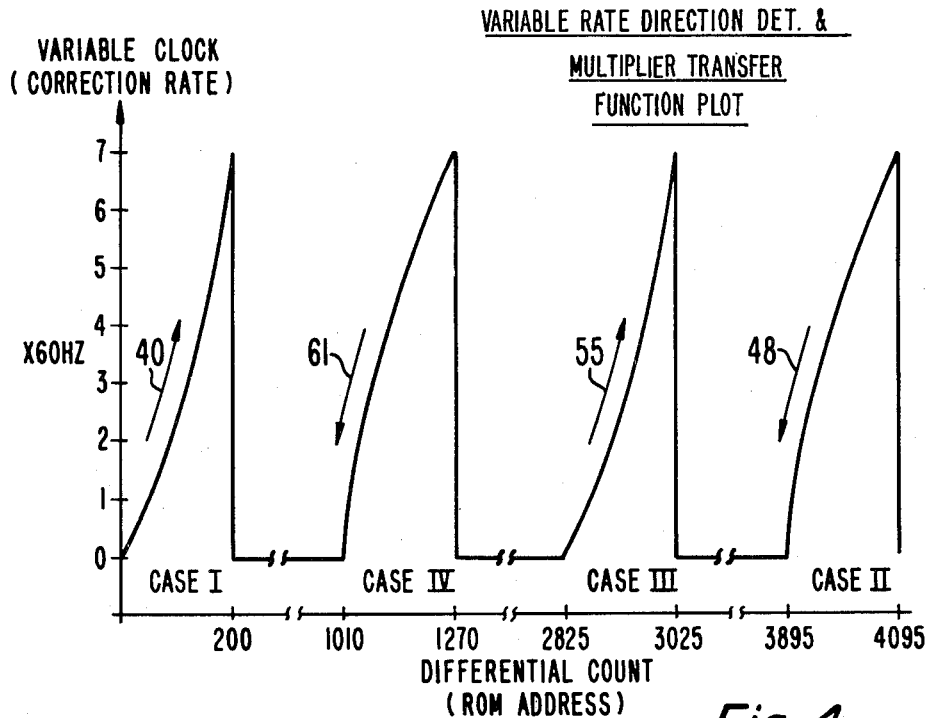
FIG. 4 shows a graph of the skew correction rate versus skew error.
Figure 5:
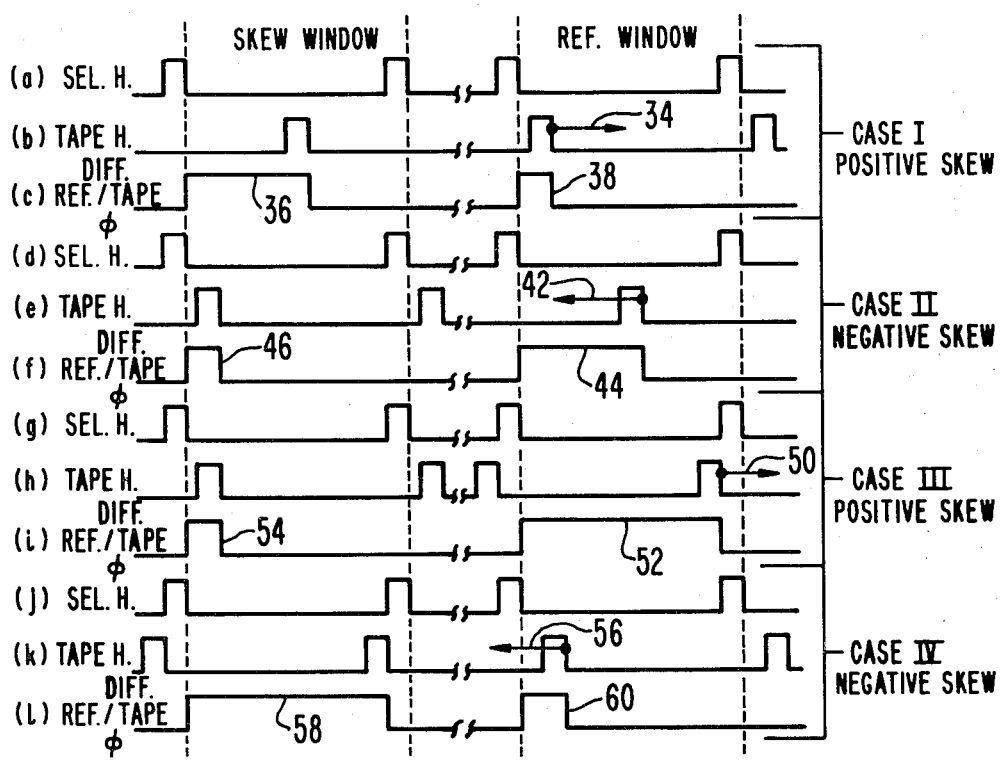
FIG. 5, including a-l, shows the defined direction and magnitude of the skew error.

The differential count from counter 24 addresses PROM 28, which in turn produces at output 30 a BCD count proportional to the magnitude of the differential count and an up/down direction pulse at output 32 whose polarity depends on the skew error direction. A conceptual plot of the BCD count and up/down pulse polarity versus differential count is shown in FIG. 4. This plot of the PROM program satisfies all four cases of differential count that arise as is explained below. The four cases of differential count are illustrated in FIG. 5 in timing diagram format. The arrows on the slopes of the BCD count plot of FIG. 4 show the proper polarity of the up/down pulse with an up count shown as an upward pointing arrow and a down count shown as a downward pointing arrow.

The case I timing diagram in FIGS. 5a, b, and c represents by definition a positive skew phase shift across one field as indicated by the arrow 34 in FIG. 5b, which arrow 34 represents the movement of the TAPE.H. pulse from the reference window position to the skew window position. The differential count that results is positive, since the first differential phase pulse 36 which causes an up count in counter 24, in FIG. 5c is wider than the second pulse 38 which causes a down count therein. The BCD count from output 30 is proportional in a parabolic fashion to the magnitude of the differential count and the arrow 40 of FIG. 4 points up the slope indicating a positive U/D pulse polarity at output 32. Since the magnitude of the detected skew error is limited to a set amount (±10 μs) the differential count is restricted to a certain range, e.g. about 200 counts for each case as illustrated.

Case II represents a negative skew phase shift across one field as indicated by the arrow 42 in FIG. 5e. The differential count that results is negative since the second phase pulse 44 in FIG. 5f is wider than the first pulse 46. The BCD count is again proportional to the differential count in a parabolic fashion. The arrow 48 in FIG. 4 now points down the slope indicating a negative skew error and thus a negative up/down pulse polarity.

Case III represents a positive skew phase shift as indicated by arrow 50 in FIG. 5h, where the reference control track phase offset plus the skew phase error has exceeded the length of one line or 63.5 microseconds. The error therefore appears to be larger and in the negative direction, since pulse 52 is wider than first pulse 54 in FIG. 5i, which is similar to case II. The PROM 28 detects this condition and corrects for positive skew error as it did in case I. The arrow 55 in FIG. 4 points up the slope indicating a positive skew error.

Case IV represents a negative skew phase shift as indicated by arrow 56 in FIG. 5k, where the set control track phase offset minus the skew error phase is less than zero microseconds and thus the skew error appears to be large and in the positive direction since first pulse 58 is wider than second pulse 60 in FIG. 5(l) which is similar to case I. The PROM 28 again detects this state and corrects for negative skew as in case II. The arrow 61 in FIG. 4 points down the slope indicating a negative skew error. The 3 bit BCD count from the output 30 is then fed to rate multiplier 62.

The rate multiplier 62 provides a varying number of serial output clock pulses during each field exactly equal to the value of 3-bit BCD code numbers applied to it. Thus it can output from zero (0) to seven (7) pulses. The clock input 64 for the rate multiplier is supplied by the horizontal line detector 16 through gate 82. Detector 16 supplies nine pulses per field as illustrated in FIG. 3e. The multiplier 62 produces a variable number of clocks as shown by the vertical axis of FIG. 4 whose number increases or decreases directly with the magnitude of the differential count or skew error, as illustrated by the horizontal axis of FIG. 4.

The VARIABLE CLOCK signal is applied to a skew storage counter 65 which accumulates the skew error and can act as a memory for the long-time storage of skew error. This counter 65 counts up or down as controlled by the U/D direction signal at input 66 in accordance with the variable clock depending on the magnitude and direction of the skew error previously detected. This counter 65 accumulates the time variant error since it is not reset by the $\overline{RESET}$ pulse once per field. The variable number clock is of a relatively low frequency so that the skew storage counter 65 acts as a digital capacitor, where the error is corrected at a rate much slower than it is detected. The detection of a step change in skew error is instantaneous while the correction rate is a maximum of 700 ns/field. Counter 65 also has count overflow/underflow protection associated with it.

This protection is provided by the overflow protection circuit 68 and is a PROM whose address lines are the four (4) MSB and the U/D direction output signal of PROM 30. The protection circuit 68 essentially detects when the output of counter 65 reaches a predetermined saturation level in either count direction from the median. When the saturation level is reached, the counter is disabled by a signal applied to an input 70 until the circuit 68 detects that the U/D direction line indicates a count direction opposed to the saturation level. This action prevents counter overflow/underflow due to the detected skew error being larger than the skew correction range. The correction range is determined by the set saturation level count multiplied by 100 nanoseconds per count. The overflow/underflow of the counter would cause a large error in skew until the skew detection subsystem could recover and correct (about 5 seconds) and thus is highly undesirable.

All eight (8) bits of the skew storage counter 65 are fed to a D/A converter 72 which finally produces a bipolar analog voltage proportional to the magnitude and direction of the tape skew error. This skew error signal is applied to a supply reel servo (not shown)

which in turn varies the tape tension, and hence the effective length of the tape.

FIG. 6 shows a table of the various machine functions and the various logic function outputs of the skew switching logic PROM 74 that results along with a general comment on each. The machine states are shown in order of their priority, thus, if the machine is in state three and if a state one condition arises the machine will jump to state one. Likewise, if the machine is in state one and a state three mode occurs, the machine will remain in state one. All modes in state three have the same priority and thus any mode change within this state has priority. This table lists all possible states of the system of FIG. 1.

The four output lines of the skew switching logic 74 have the following effects on the system of FIG. 1. When the 120° line 76 is active, the horizontal line detector 16 is informed that the tape video information is now lagging the reference video information at inputs 20, 10 and 12 by ⅓ of a field and thus to shift all control signals generated by the latter by 262.5/3 lines. This condition occurs in SPLICE PLAY when reading off the SIMULPLAY heads (state three of FIG. 6). When the $\overline{ZERO}$ line 78 is active, both the 1 field skew error magnitude detector 24 and the skew storage counter 65 are reloaded to their zero states. This condition arises in MANUAL TEST TAPE SET, MANUAL, THREAD, and NORMAL VIDEO RECORD states. When the $\overline{FREEZE}$ line 80 is active, the CLOCK is gated off by AND gate 82 and the skew storage counter 65 remains in its previous state, thus storing the last skew error correction. This condition results during the VIDEO SPLICE RECORD, VAR PLAY, and JOG state. When the DISABLE line 84 is high, the skew servo loop is opened by switch 86. This state happens in MANUAL, THREAD, NORMAL VIDEO RECORD, and in all other modes not mentioned. e.g. VARIABLE WIND, STOP, etc. Manual operation is provided for by switch 92 (shown in the automatic position) and manual skew potentiometer 94. Switch 92 allows the manual setting of skew error correction.

The servo loop also contains dropout protection. A video line dropout coincident with the REF/SKEW WINDOW pulse will cause the CLOCK to be gated off for the field in which the dropout occurs. This is illustrated in FIG. 1 by input 88, which receives a dropout signal which disables AND gate 90 and thence gate 82 to block the input clock of multiplier 62. Therefore, the last valid skew error correction is held for the dropout field preventing erroneous skew information from entering the loop.

Referring to FIG. 7 which shows the details of the exclusive OR phase detector 18, two signals applied to input terminals on the left hand side are the TAPE.H. (FIG. 8b) and REF/SKEW WINDOW signals. If REF/SKEW WINDOW is low, flip flop 100 is cleared, the Q output 104 is low with the result that a logic "0" appears on both inputs of the exclusive OR gate 106. The output of gate 106 is then a logic "0". Thus the output of inverter 108, which is the signal DIFF. REF/TAPE PHASE, is a logic "1".

When REF/SKEW WINDOW goes high, flip flop 100 is then able to function as a J-K flip flop. Referring to FIGS. 8a and 8c it will be seen that REF/SKEW WINDOW goes high on a negative going edge of SEL.H. This action releases flip flop 100 from the clear mode, with output 104 remaining low until a negative edge of TAPE.H. occurs. If there exists a phase lag between SEL.H. and TAPE.H. as shown in FIGS. 8a and 8b, the Q output 104 of flip flop 100 will appear as shown in FIG. 8d. The Q output 104 remains low until the negative edge of TAPE.H. occurs. Then output 104 goes high and remains high until CLR input 102 or REF/SKEW WINDOW goes low.

Thus, appearing on the inputs of gate 106 in the REFERENCE or SKEW WINDOW time frame are REF/SKEW WINDOW and output 104 signals. The exclusive OR of these two signals is shown as 106 output in FIG. 8e. The resulting positive pulse is the exact phase difference between SEL.H. and TAPE.H. This signal is then inverted by inverter 108 where the negative pulse is now a measure of phase difference, for proper circuit interfacing and is the DIFF REF/TAPE PHASE signal of FIG. 8f.

What is claimed is:

1. A method for correcting for the effects of television recording tape effective length variations, said method comprising comparing a horizontal synchronization signal from the tape with a reference horizontal synchronization signal at two different times per field just before and just after the vertical period respectively to form two comparison signals, subtracting said two comparison signals from each other to form an error signal, and using said error signal to correct for the effects of said effective length variations.

2. A method as claimed in claim 1 wherein said subtracting step comprises counting up and then down for the first and second comparison signals respectively.

3. A method as claimed in claim 1 wherein said using step comprises storing error signals so the error is corrected at a rate slower than it is detected.

4. An apparatus for correcting television recording tape length variations, said apparatus comprising a source of a reference horizontal synchronization signal, means for comparing a horizontal synchronization signal from the tape with said reference horizontal synchronization signal at two different times per field just before and just after the vertical period respectively to form two comparison signals, means for subtracting said two comparison signals from each other to form an error signal, and means for using said error signal to correct for the effects of said effective length variations.

5. An apparatus as claimed in claim 4 wherein said subtracting means comprises an up-down counter for counting up and then down for the first and second comparison signals respectively.

6. An apparatus as claimed in claim 4 wherein said using means comprises means for storing error signals so the error is corrected at a rate slower than it is detected.

7. An apparatus as claimed in claim 4 wherein said comparing means comprises an exclusive OR phase detector.

8. An apparatus as claimed in claim 7 wherein said comparing means further comprises a counter, and a horizontal line detector coupled to said counter and to said phase detector.

9. An apparatus as claimed in claim 4 wherein said using means comprises a variable rate direction detector coupled to said subtracting means, a rate multiplier coupled to said detector, a storage circuit coupled to said rate multiplier, and a digital to analog converter coupled to said storage circuit.

10. An apparatus as claimed in claim 9, further comprising overflow protection means for said storage circuit.

11. An apparatus as claimed in claim 7 wherein said exclusive OR phase detector comprises a flip flop, and an exclusive OR gate coupled to said flip flop.

* * * * *